Sept. 14, 1943. J. JONASSEN 2,329,202
MACHINE FOR FORMING CLIPS AND CONNECTING
WIRE MEMBERS TOGETHER THEREBY
Filed May 29, 1941  4 Sheets-Sheet 1

INVENTOR.
JONAS JONASSEN
BY Clark & Ott
ATTORNEYS

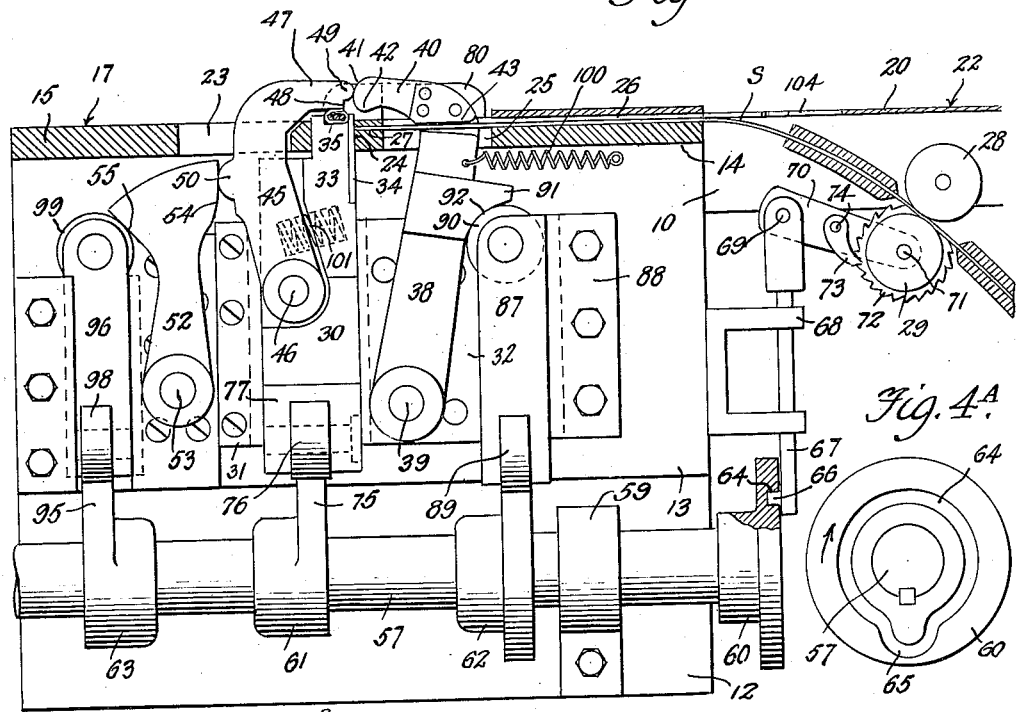
Fig. 4.
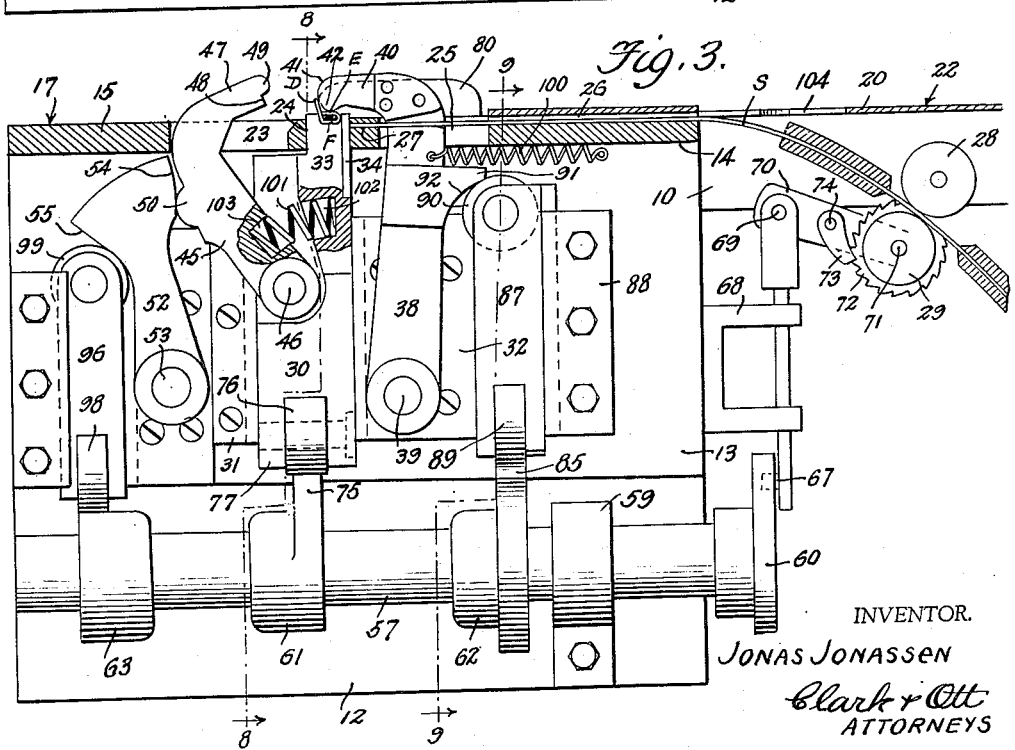
Fig. 3.
Fig. 4A.
INVENTOR.
JONAS JONASSEN
ATTORNEYS Sept. 14, 1943.   J. JONASSEN   2,329,202
MACHINE FOR FORMING CLIPS AND CONNECTING
WIRE MEMBERS TOGETHER THEREBY
Filed May 29, 1941   4 Sheets-Sheet 3

INVENTOR.
JONAS JONASSEN
BY
Clark & Ott
ATTORNEYS

Sept. 14, 1943.                    J. JONASSEN                    2,329,202
              MACHINE FOR FORMING CLIPS AND CONNECTING
                    WIRE MEMBERS TOGETHER THEREBY
                         Filed May 29, 1941            4 Sheets-Sheet 4
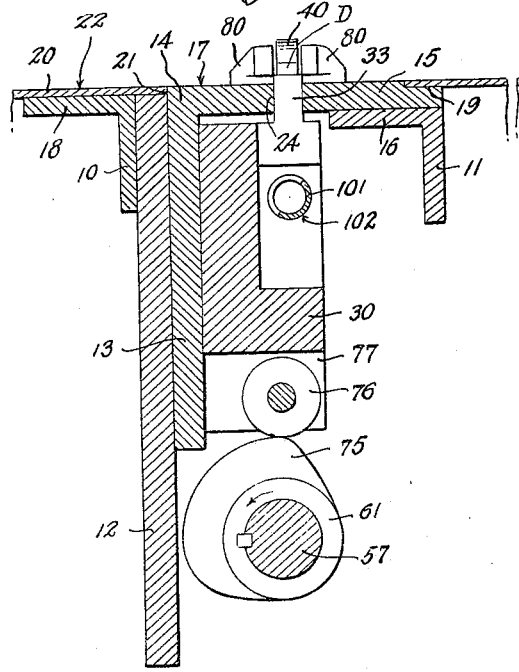
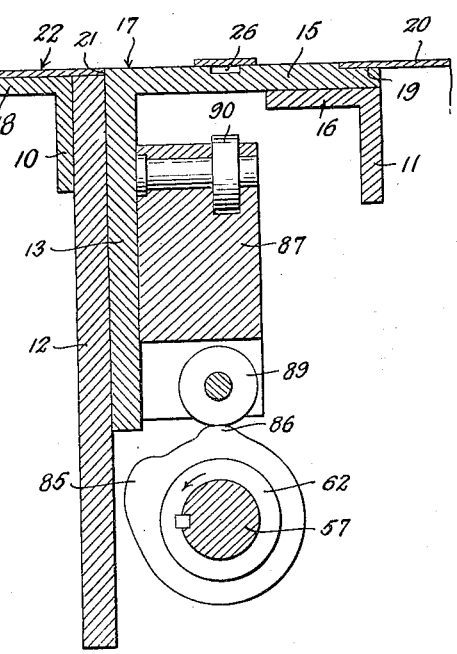
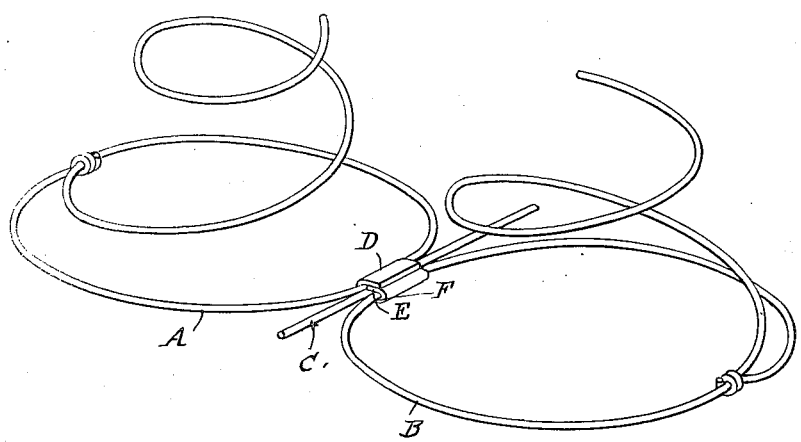
INVENTOR.
JONAS JONASSEN
BY
Clark & Ott
ATTORNEYS Patented Sept. 14, 1943

2,329,202

UNITED STATES PATENT OFFICE 2,329,202

MACHINE FOR FORMING CLIPS AND CONNECTING WIRE MEMBERS TOGETHER THEREBY

Jonas Jonassen, Lynbrook, N. Y., assignor, by mesne assignments, to Samuel Krakauer, New York, N. Y., and Samuel S. Marcus, Lewisboro, N. Y., jointly Application May 29, 1941, Serial No. 395,750

8 Claims. (Cl. 140—3)

This invention relates to machines for forming and applying clips to wire members to secure the same together and while not restricted to such use, the same is particularly directed to an improved machine for securing together by means of clips, the coil springs and other elements which constitute the inner structure of mattresses, seat cushions and the like.

The invention broadly comprehends a machine of the indicated character which embodies an improved mechanism for successively cutting off from a strip of material, predetermined lengths thereof and bending the severed lengths into clip form and into embracing relation with two or more adjacent wire members arranged and held in contiguous relation to each other.

An important feature of the invention resides in the provision of cutting and forming dies which are so constructed, arranged and actuated as to render the machine capable of automatically compensating within reasonable limits for variations in the number and gages or thicknesses of the wires which are being clipped together thereby, so that without changing the sizes or adjusting the forming dies, two or more wire members of gages may be clipped together.

More particularly the invention contemplates in a machine of the character set forth, oppositely arranged clip bending dies which, in addition to performing their primary function of bending the clip terminals into embracing relation with the wire members being clipped together, also cooperatively function to initiate the retractive movement of each other so as to free the dies from binding impingement with the clip and thereby prevent any lag or failure in the operation thereof.

As a still further object, the invention resides in a machine which is comparatively simple in its construction and mode of operation and in which all of the operating parts thereof are actuated by means of a single cam shaft upon each complete rotation thereof.

With the above enumerated and other objects in view, the invention is set forth in greater detail in the following specification and illustrated in the accompanying drawings in which:

Fig. 3 is a view similar to Fig. 1 illustrating the position of the rear bending die after the rear clip terminal has been bent to overlying relation with the wire members being clipped together.

Fig. 4 is a view similar to Fig. 1 illustrating the forward bending die member immediately following the bending down of the forward clip terminal and the completion of the clipping operation.

Fig. 4A is a face view of the strip feeding cam member.

Fig. 8 is a fragmentary transverse sectional view taken approximately on the line 8—8 of Fig. 3.

Fig. 9 is a fragmentary transverse sectional view taken approximately on the line 9—9 of Fig. 3.

Fig. 10 is a perspective view of the finished clip in applied position securing together a pair of spring members and a reenforcing spacing wire member.

Figure 1:
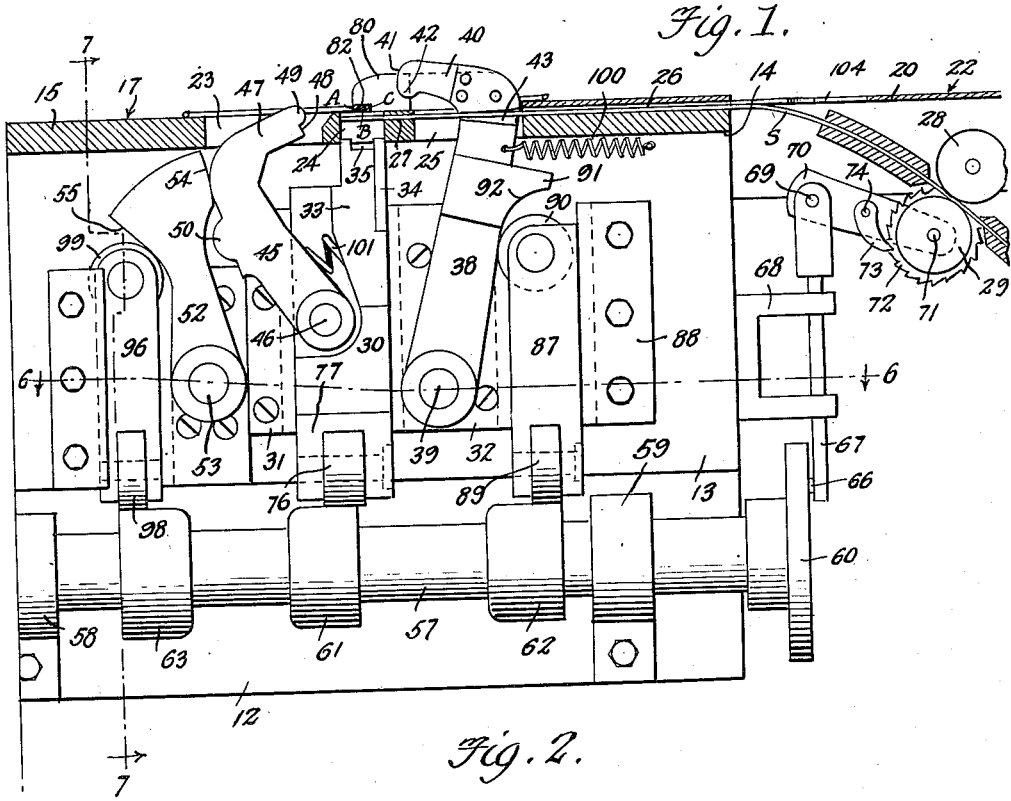
Fig. 1 is a fragmentary vertical front to rear sectional view through a clip forming and applying machine taken approximately on the line 1—1 of Fig. 5 and illustrating the retracted positions of the cutting, forming and bending dies.

Referring to the drawings by characters of reference, the frame of the machine includes parallel horizontally disposed upper angulated frame members 10 and 11 extending forwardly and rearwardly of the machine. The frame member 10 has secured thereto intermediate its ends and depending therefrom a plate 12 which in turn has secured thereagainst the vertical lead 13 of an angulated support 14, the horizontal upper lead 15 of which extends across and is supported upon the horizontal flange 16 of the frame member 11 with the upper surface 17 of said horizontal lead 15 disposed in a plane slightly above the upper surface of the horizontal lead 18 of the frame member 10.

The upper corner of the lead 15 adjacent its free edge which rests upon the frame member 11 is rabbeted as at 19 and a table of sheet metal 20 having a central opening 21 rests upon the upper surface of the frame member 10 and the rabbeted portion 19 to provide a work supporting surface 22 flush with the work supporting surface 17 of the upper lead 15 of the support 14. The lead 15 is formed with slots 23, 24, and 25 disposed in fore and aft alignment. The upper surface 17 of the lead 15 of the supporting panel is formed with a groove 26 extending from the rear thereof forwardly and opening into the rear wall of the slot 25. A tunnel or passage 27 disposed in alignment with the groove 26 extends forwardly from the slot 25 and opens into the rear wall of the slot 24. The groove 26 and tunnel or passage 27 are adapted to receive for guided movement longitudinally thereof, a strip of material S from a roll or other source of supply, not shown, and said strip is intermittently fed between and by means of a pair of friction rollers 28 and 29 so that the forward end of the strip extends into intersecting relation with and longitudinally of the intermediate slot 24.

A cutting and forming die 30 is mounted for guided vertical reciprocatory movement between a pair of guides 31 and 32 which are secured to the face of the vertical lead 13 of the angulated support 14. The cutting and forming die 30 includes at its upper end a rabbeted cutting head 33 having a removable cutting blade section 34 which head, together with the cutting blade section define a notch 35 at the upper edge thereof and the upper end of which cutting and forming die member is adapted to be projected upwardly through the intermediate slot 24 of the lead 15 of the support and to be retracted downwardly below the plane of the bottom wall of the tunnel or passage 27.

A rearwardly disposed clip bending die 38 is also provided which is mounted for fore and aft swinging movement on a transverse fulcrum pin 39 suitably anchored to the vertical lead 13 of the angulated support 14. The upper end of said pivoted clip bending die 38 extends through the rear slot 25 and is provided with an angulated forwardly directed terminal 40 having a convex forward extremity 41 and a depending rounded nose 42 constituting a continuation of and merging with the convex forward terminal 41. The portion of the die member 38 which is disposed within the rear slot 25 of the table is formed with an opening 43 extending fore and aft thereof, which opening is of a size to align respectively with the groove 26 and the tunnel or passage 27 in all positions of the clip bending die 38 so as to freely receive therethrough the clip forming strip of material S as it is fed from the source of supply through the groove and tunnel or passageway.

A forwardly disposed clip bending die member 45 is pivotally mounted on a transverse fulcrum pin 46 upon the reciprocatory cutting and forming die 30 for vertical reciprocatory movement therewith and for fore and aft swinging movement. The upper end of said die member 45 extends through the forward slot 23 and protrudes above the upper surface 17 of the angulated support 14 and said upper end is formed with an angulated rearwardly directed terminal 47 having a substantially perpendicular rear face 48 with a convex bill 49 protruding rearwardly from the upper portion thereof. The die member 45 intermediate its forward edge and below the upper lead 15 of the angulated support 14 is formed with a semi-circular forwardly projecting abutment lug 50.

A rock arm 52 fulcrumed on a transverse pin 53 suitably supported from the vertical lead 13 of the angulated support 14 is mounted for fore and aft swinging movement and is formed at its upper end with a convex rear surface 54 for engagement with the forwardly disposed clip bending die 45, said rock arm being also provided with a forwardly inclined cam surface 55 at its upper end.

A cam shaft 57 extends forwardly and rearwardly of the machine and is suitably journaled in bearings 58 and 59 which are supported by the portion of the plate 12 below the support 14 and located below the die members 30, 38 and 45 and below the rock arm 52. The cam shaft is driven by any suitable means and controlled by any suitable mechanism, not shown, for imparting a single and complete revolution thereto upon each manipulation of the machine by the operator. The cam shaft has secured thereto in longitudinally spaced relation thereon cam members 60, 61, 62 and 63. The cam member 60 is provided with a cam groove 64 having an eccentric portion 65 and is engaged by a cam pin 66 on a vertical connecting rod 67 which is mounted for reciprocation in a bearing 68. The connecting rod is pivotally connected by a pin 69 with a rock lever 70 which is fulcrumed on the shaft 71 which supports the friction roller 29 and a ratchet wheel 72. A ratchet pawl 73 is fulcrumed as at 74 on the rock lever 70 and engages the teeth of the ratchet wheel 72 to effect feeding of the clip forming strip S upon the initial turning of the cam shaft 57. The forward end of the strip S is thus advanced longitudinally of the intermediate slot 25 over the upper end of the cutting and forming die member 30, while the same is in the retracted position as shown in Fig. 1 of the drawings.

The cam member 61 is formed with a radially protruding cam lug 75 which is designed to engage a cam roller 76 journaled in the bifurcated lower end portion 77 of the cutting and forming die member 30 and said cam lug 75 is so disposed with reference to the offset portion 65 of the cam groove 64 as to immediately succeed the feeding of the forward end of the strip longitudinally of the intermediate slot 24 so that the cutting and forming die member 30 is moved upwardly directly after the forward portion of the strip has been fed thereover.

Figure 2:
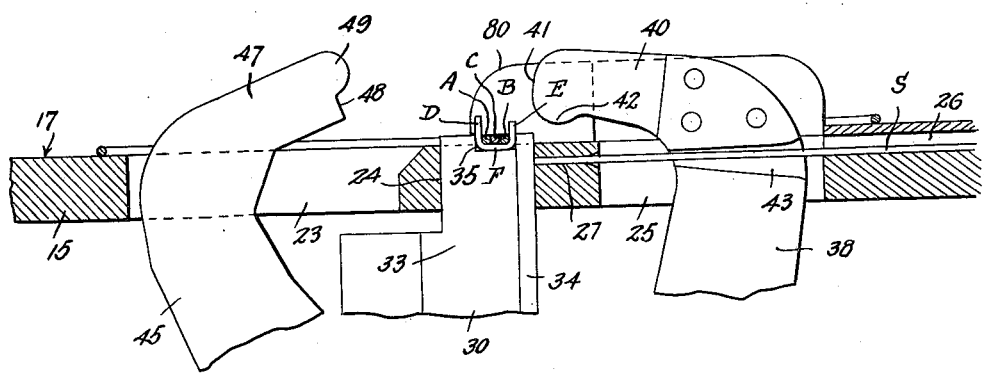
Fig. 2 is an enlarged fragmentary sectional view similar thereto and illustrating the cutting and bending die after the same has severed the clip forming section and bent the same in juxtaposition to and straddling the wire members to be clipped together.
Figure 5:
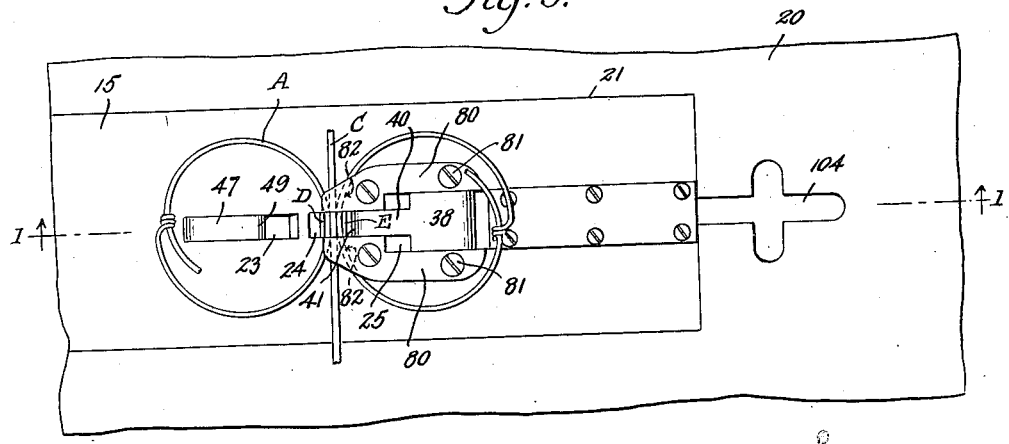
Fig. 5 is a fragmentary plan view of the central portion of the machine.
Figure 6:
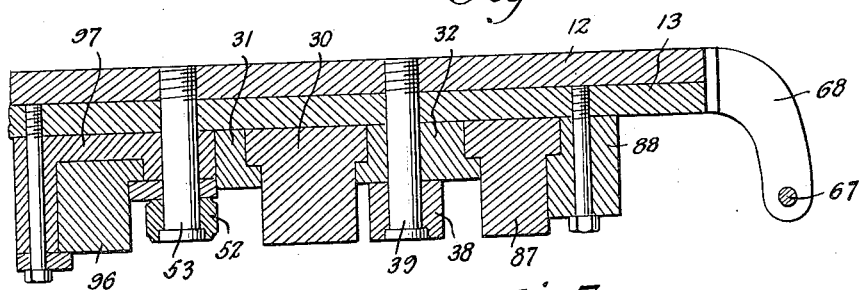
Fig. 6 is a fragmentary horizontal sectional view taken approximately on the line 6—6 of Fig. 1.
Figure 7:
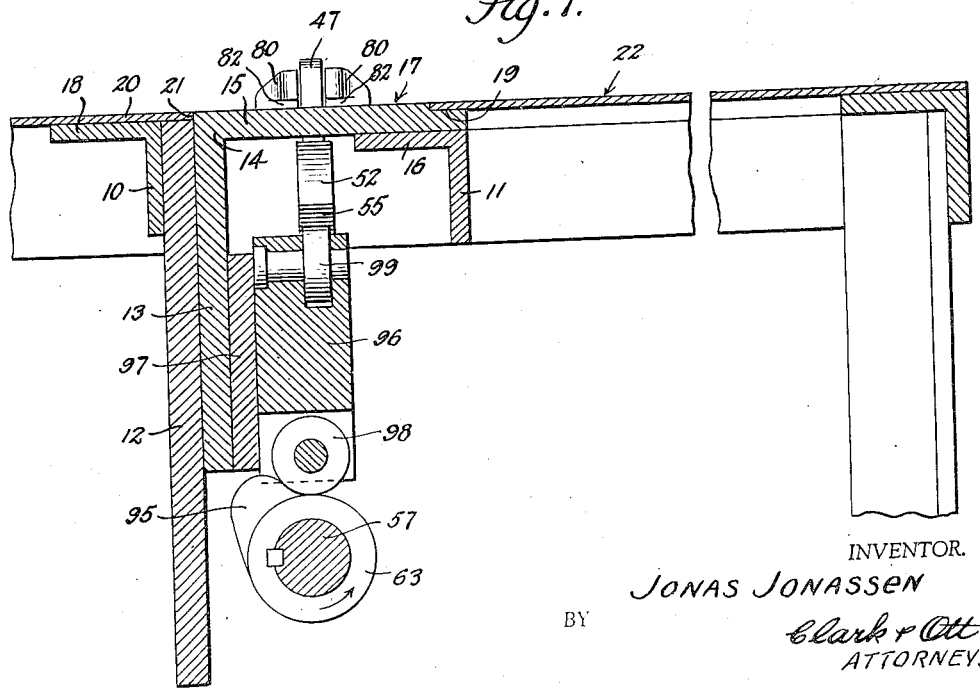
Fig. 7 is a fragmentary transverse vertical sectional view taken approximately on the line 7—7 of Fig. 1.

In order to retain the wire members A, B and C in juxtaposition to each other and against rearward and upward movement during the operation of forming and securing the clip in encompassing relation thereto, a pair of gage elements 80 are secured on the upper surface 17 of the horizontal lead 15 of the angulated support 14 by means of screws or other fastening devices 81. The gage elements 80 are arranged parallel to each other on opposite sides of the intermediate slot 24 and the forward lower corners of said elements are rabbeted as at 82 to receive in said rabbeted portions the wire members A, B and C for the purpose of gaging the emplacement of the wire members. With the wire members thus arranged and retained in place on the upper surface 17 of the support 14 within the rabbeted portions 82 and extending transversely across the intermediate slot 24, it is apparent that as the cutting and forming die member 30 is moved upwardly directly after the forward portion of the strip has been fed thereover, the portion of the strip which has been fed beyond the rear wall of the intermediate slot 24 will be severed as the cutting blade section 34 of the head passes upwardly beyond the tunnel or passage 27 and said severed portion being carried upwardly on the upper end surface of the head 33 will have the terminal portions D and E bent upwardly with reference to the intermediate portion F by means of the notch 35 so that the intermediate portion and the wire members will be disposed within the notch 35 with the terminals D and E projecting above the upper end surface of the head 33 of the cutting and forming die 30. The cam member 62 is formed with circumferentially spaced cam lugs 85 and 86, the former lug 85 being the leading lug in the direction of rotation of the cam, and the latter being the following lug and the lug 85 being of greater height than the following lug 86. The lug 85 is so positioned with reference to the lug 75, controlling the cutting and forming die, that the rearwardly disposed clip bending die 38 is swung forwardly immediately following the severing and bending of the severed end of the strip S as shown in Fig. 2 of the drawings. This movement of the clip bending die 38 is accomplished by means of a cam follower 87 which is mounted for vertical guided movement between the guide 32 and a parallel guide 88 secured to the face of the vertical lead 13 of the angulated support 14. The cam follower has journaled in its bifurcated lower end a cam roller 89 which is maintained in engagement with the periphery of the cam member 62. The cam follower has journaled in its upper end a roller 90 which contacts with the rear edge of the clip bending die 38 and with a rearwardly protruding cam lug 91 having a concave cam face 92. As the cam follower is moved upwardly by engagement of the cam lug 85 with the cam roller 89, the roller 90 effects a forward swinging movement of the die 38 so that the depending rounded nose 42 of the bending die 38 engages with the upstanding rear terminal E of the severed U-shaped section of the strip S to bend said terminal E forwardly into overlying relation with the wire members as shown in Fig. 3, and at the same time imparting a clinching of the wire members between the lower connecting portion F and the terminal E.

The cam member 63 is provided with a radially projecting cam lug 95 which is so positioned with reference to the cam lugs 85 and 86 of the cam member 62 as to function immediately following the operation of the leading cam lug 85 and to function immediately in advance of the operation of the following cam lug 86. The cam lug 95 of the cam member 63 controls a cam follower 96 which is mounted for vertical guided movement within a guideway 97 secured to the face of the vertical lead 13 of the angulated support 14.

The cam follower 96 has journaled in its lower bifurcated end a cam roller 98 which is maintained in engagement with the periphery of the cam member 63. The cam follower 96 has journaled in its upper end a cam roller 99 which contacts with the forwardly inclined cam surface 55 at the upper end of the rock arm 52 whereby as the cam follower 96 is moved upwardly by engagement of the cam lug 95 with the cam roller 98, the rock arm 52 is swung rearwardly by the engagement of the convex rear surface 54 with the abutment lug 50. This in turn imparts a rearward swinging movement of the forwardly disposed clip bending die member 45 from the position shown in Fig. 3 to the position shown in Fig. 4. As the die member is swung rearwardly, its lower rear corner engages with the upstanding forward terminal D of the severed U-shaped section of the strip S to bend said terminal D rearwardly into overlapping relation with the terminal E and into overlying relation with the wire members as shown in Fig. 4 of the drawings thereby tightly impinging the terminal D over the terminal E and producing the finished clip which encompasses and secures the wire members together.

During the rearward swinging movement of the die member 45, it will be observed that the convex bill 49 which protrudes rearwardly from the upper portion of the perpendicular rear face 48 of the angulated terminal 47 of said die member engages with the convex forward extremity 41 of the angulated terminal 40 of the die member 38 and initiates the retractive movement of the die member 38 which is thereby freed from the binding impingement of the depending rounded nose 42 with the terminal E of the clip so that a contractile retractor spring 100 will insure the further rearward swinging movement of the die member 38 into engagement with the roller 90 of the cam follower 87.

Immediately after the die member 45 has completed its rearward movement and effected the bending down of the forward terminal D, the following cam lug 86 of the cam member 62 functions to again raise the cam follower 87 and thereby swing the die member 38 forwardly so that the convex forward terminal 41 thereof engages with and initiates the retractive forward swinging movement of the die member 45 to release the binding impingement of the lower rear surface of the angulated rearwardly directed terminal 47 with the terminal D of the clip. In order to insure the complete retraction and forward swinging movement of the die member 45, a coiled expansion spring 101 is employed and the opposite ends of said spring are seated in confronting sockets 102 and 103 formed in the die members 30 and 45 respectively. This second or subsequent forward movement of the die member 38 is less than the initial forward movement due to the lesser height of the following lug 86 so that the nose 42 does not again engage the clip and consequently the power of the retractor spring 100 will immediately cause the subsequent retraction or rearward swinging movement of the die member 38. The functioning of the bending die members 38 and 45 to initiate the retractive movement of each other has been found desirable as a means for preventing the binding impingement of the bending die members on the clip from causing any lag or failure in the operation thereof. It will also be observed and understood that the cam lug 75 of the cam member 61 is of such a length and the duration of its engagement with the cam roller 76 is so proportioned as to maintain the cutting and forming die 30 in the elevated position shown in Figs. 2, 3 and 4, during the period of time in which the bending dies 38 and 45 are functioning to effect the bending of the clip terminals and their release and retraction therefrom.

As illustrated, the table 20 is provided with a cruciform slot 104 communicating at one end with one end of the central opening 21 to provide means for the insertion therethrough of a hooked implement for facilitating the initial introduction of the forward end of the strip S into the rear end of the groove 26.

What is claimed is:

1. In a machine for connecting together a plurality of wire members, means defining a surface upon which the wire members to be joined are adapted to be supported in juxtaposition to each other, means for retaining said juxtaposed wire members against rearward or upward movement, means for feeding a predetermined length of strip material beneath said juxtaposed wire members, a cutting and bending die member movable upwardly from below said length of strip material and constituting a common means for cutting off a section of and bending the same into U-shaped form with the medial portion thereof underlying and the upstanding terminals thereof disposed on opposite sides of said juxtaposed wire members, and means successively movable in opposite directions over and across said wire members for bending said upstanding terminals into overlying relation with the juxtaposed wire members to provide a clip encompassing and securing the wire members together.

2. In a machine for connecting together a plurality of wire members, means defining a surface upon which the wire members to be joined are adapted to be supported in juxtaposition to each other, means for retaining said juxtaposed wire members against rearward or upward movement, means for feeding a predetermined length of strip material beneath said juxtaposed wire members, means movable upwardly from below said length of strip material for cutting off a section of and bending the same into U-shaped form with the medial portion thereof underlying and the upstanding terminals thereof disposed on opposite sides of said juxtaposed wire members, a pair of die members successively movable in opposite directions over and across said wire members for bending said upstanding terminals into overlying relation with the juxtaposed wire members to provide a clip encompassing and securing the wire members together, and means on the confronting terminals of said die members engageable with each other to initiate the retractive movement thereof so as to free the dies from binding impingement with the clip.

3. In a machine for connecting together a plurality of wires, a support defining a surface upon which the wires to be joined are adapted to be supported in juxtaposition to each other, means for retaining said juxtaposed wires against rearward or upward movement, means for feeding a predetermined length of strip material beneath said juxtaposed wires, a cutting and forming die member movable upwardly from below said length of strip material and constituting a common means for successively cutting off a section of and bending the same into U-shaped form to provide a clip with a medial portion thereof underlying said juxtaposed wire and with upstanding terminals disposed on opposite sides thereof, a pair of bending die members pivoted respectively to said support and to said cutting and forming die member for swinging movement in opposite directions over and across the cutting and forming die member for successively bending the upstanding clip terminals towards each other and into overlying relation with the wires to secure the wires together.

4. In a machine for connecting together a plurality of wires, a support defining a surface upon which the wires to be joined are adapted to be supported in juxtaposition to each other, means for retaining said juxtaposed wires against rearward or upward movement, means for feeding a predetermined length of strip material beneath said juxtaposed wires, a cutting and forming die member mounted on said support for vertical guided movement, a pair of bending die members pivoted respectively on a fulcrum fixed to said support and on a fulcrum carried by the vertically movable cutting and forming die member for swinging movement in opposite directions over and across the cutting and forming die member, a rotary driven shaft carried by said support having cams secured thereto, and means engageable respectively with said cams and die members for imparting upon rotation of said shaft, timed movement to the die members for effecting the cutting off of a predetermined length of said strip material, the bending of the same into U-shaped form to provide a clip with the medial portion thereof underlying said wires and the upstanding terminals thereof disposed on opposite sides of the wires and the bending of said terminals in opposite directions over said wires into overlying clamping relation therewith.

5. In a machine for connecting together a plurality of wires, a support defining a surface upon which the wires to be joined are adapted to be supported in juxtaposition to each other, means for retaining said juxtaposed wires against rearward or upward movement, means for feeding a predetermined length of strip material beneath said juxtaposed wires, a cutting and forming die member mounted on said support for vertical guided movement, a pair of bending die members pivoted respectively to said support and said cutting and forming die member for swinging movement in opposite directions over and across the cutting and forming die member, a rotary driven shaft carried by said support having cams secured thereto, and means engageable respectively with said cams and die members for imparting upon rotation of said shaft, timed movement to the die members for effecting the cutting off of a predetermined length of said strip material, the bending of the same into U-shaped form to provide a clip with the medial portion thereof underlying said wires and the upstanding terminals thereof disposed on opposite sides of the wires and the bending of said terminals in opposite directions over said wires into overlying clamping relation therewith, said pivotally mounted bending die members having confronting terminals engageable with each other to initiate the retractive movement thereof so as to free the dies from binding impingement with the clip terminals after the bending operation.

6. In a machine for connecting together a plurality of wires, an angulated support having a vertical lead and an upper slotted horizontal lead defining a surface upon which the wires to be joined are adapted to be supported in juxtaposition to each other in spanning relation to the slotted portion thereof, means for retaining said juxtaposed wire members relative to said slotted portion and against rearward and upward movement, means for feeding a predetermined length of strip material within the slotted portion beneath said juxtaposed wires, a cutting and forming die member mounted on the vertical lead of said support for vertical guided movement upwardly through said slotted portion, a pair of bending die members pivoted respectively to the vertical lead of said support and to said cutting and forming die member, said bending die members having angulated terminals protruding upwardly through the slotted portion of the support and adapted for swinging movement in opposite directions over and across the cutting die member, a rotary driven shaft carried by said support and having cams secured thereto, and means engageable respectively with said cams and die members for imparting, upon each rotation of the shaft, timed movement to the die members for effecting upward movement of the cutting and forming die to sever a section of the strip material and effect the bending of the severed section into U-shaped form to provide a clip with the medial portion thereof underlying and the upstanding terminals thereof disposed on opposite sides of said juxtaposed wires and the successive swinging movement of the bending die members in opposite directions over the wires for bending the clip terminals towards each other into clamping relation with the wires.

7. In a machine for connecting together a plurality of wire members, means for supporting and retaining said wire members in juxtaposed position, means for feeding a predetermined length of strip material beneath said juxtaposed wire members, a cutting and forming die movable upwardly from below said length of strip material for cutting off a section of and bending the same into U-shaped form to provide a clip with the medial portion thereof underlying said juxtaposed wire members and with the upstanding terminals disposed on opposite sides thereof, a pair of bending dies pivoted respectively to a fixed support and to the cutting and forming die for swinging movement in opposite directions over and across the cutting and forming die for successively bending the upstanding clip terminals towards each other into overlying relation with the wire members so as to secure the same together, one of said bending dies having an opening through which the strip of clip forming material is fed.

8. In a machine for connecting together a plurality of wires, an angulated support having a vertical lead and an upper slotted horizontal lead defining a surface upon which the wires to be joined are adapted to be supported in juxtaposition to each other in spanning relation to the slotted portion thereof, means for retaining said juxtaposed wire members relative to said slotted portion and against rearward and upward movement, means for feeding a predetermined length of strip material within the slotted portion beneath said juxtaposed wires, a cutting and forming die member mounted on the vertical lead of said support for vertical guided movement upwardly through said slotted portion, a pair of bending die members pivoted respectively to the vertical lead of said support and to said cutting and forming die member, said bending die members having angulated terminals directed towards each other protruding upwardly through the slotted portion of the support and adapted for swinging movement in opposite directions over and across the cutting die member, a rotatory driven shaft carried by said support and located below the cutting and forming die members, a cam for each die member secured to said shaft, and means engageable respectively with said cams and said die members for imparting upon each rotation of the shaft, timed movement to the die members for successively effecting the upward movement of the cutting and forming die to sever a section of the strip material, the bending of the severed section into U-shaped form to provide a clip with the medial portion thereof underlying and the upstanding terminals thereof disposed on opposite sides of said juxtaposed wires, the successive swinging movement of the bending die members in opposite directions over the wires for bending the clip terminals towards each other into clamping relation with the wires, the retractive swinging movement of said bending dies and the retractive downward movement of said cutting and forming die.

JONAS JONASSEN.